United States Patent [19]

Ngo et al.

[11] Patent Number: 5,802,375
[45] Date of Patent: Sep. 1, 1998

US005802375A

[54] OUTER LOOP VECTORIZATION

[75] Inventors: Viet N. Ngo, Eagan; Wei-Tek Tsai, New Brighton, both of Minn.

[73] Assignee: Cray Research, Inc., Eagan, Minn.

[21] Appl. No.: 344,236

[22] Filed: Nov. 23, 1994

[51] Int. Cl.⁶ .................................................. G06F 9/45
[52] U.S. Cl. .......................................................... 395/709
[58] Field of Search ............................ 395/700, 701–709

[56] References Cited

U.S. PATENT DOCUMENTS

| | | | |
|---|---|---|---|
| 4,128,880 | 12/1978 | Cray, Jr. | 395/800.04 |
| 4,636,942 | 1/1987 | Chen et al. | 395/742 |
| 4,642,764 | 2/1987 | Auslander et al. | 395/709 |
| 4,710,872 | 12/1987 | Scarborough | 395/707 |
| 4,782,444 | 11/1988 | Munshi et al. | 395/709 |
| 4,833,606 | 5/1989 | Iwasawa et al. | 395/709 |
| 4,843,545 | 6/1989 | Kikuchi | 395/707 |
| 4,847,755 | 7/1989 | Morrison et al. | 395/379 |
| 5,107,418 | 4/1992 | Cramer et al. | 395/709 |
| 5,161,216 | 11/1992 | Reps et al. | 395/704 |
| 5,274,812 | 12/1993 | Inoue | 395/705 |
| 5,481,723 | 1/1996 | Harris et al. | 395/706 |
| 5,485,619 | 1/1996 | Lai et al. | 395/706 |
| 5,584,027 | 12/1996 | Smith | 365/707 |

OTHER PUBLICATIONS

Michael Wolf, "High Performance Compilers 1992," Oregon Graduate Institute, Workshop, pp. 348–353 and pp. 370–379.

Banjeree, Loop Transformations for Restructuring Compilers: The Foundations, Kluwer Academic Publishers, 1993; pp. 1–48.

Zima et al., Supercompilers for Parallel and Vector Computers, ACM Press Frontier Series, Addison–Wesley, Menlo Park, CA 1991; pp. 218–237.

Allen et al., Automatic Translation of Fortran Programs to Vector Form, ACM Transactions on Programming Languages and Systems, Oct. 1987, vol. 9, No. 4; pp. 490–542.

Bose, Heuristic Rule–Based Program Transformations for Enhanced Vectorization, Proceedings for the International Conference on Parallel Processing, 1988; pp. 63–66.

S. Carr, Memory–Hierarchy Management PhD thesis, Rice University, Oct. 1992; pp. 1–87.

Aho, Sethi and Ullman, Compilers, Principles, Techniques and Tools, Addison–Wesley, 1986; Ch. 9, pp. 585–722.

*Primary Examiner*—Alvin E. Oberley
*Assistant Examiner*—St. John Courtenay, III
*Attorney, Agent, or Firm*—Schwegman, Lundberg, Woessner & Kluth, P.A.

[57] ABSTRACT

A system and method for vectorizing a non-innermost loop of a nested loop. Iterative loops of a nested loop are analyzed to determine if they can be vectorized (vector legality). If more than one iterative loop can be vectorized, a selection criteria is applied to select the iterative loop which would provide the most return from vectorization (vector selection).

8 Claims, 7 Drawing Sheets

```
L₁  :   DO I₁ = 1,N₁
            B₁,₁
            ...
Lₘ  :       DO Iₘ = 1,Nₘ
                Bₘ,₁
Lₘ₊₁:           DO Iₘ₊₁ = 1,Nₘ₊₁
                    Bₘ₊₁,₁
                    ...
Lₙ  :               DO Iₙ = 1,Nₙ
                        Bₙ,₁
                    ENDDO
                    ...
                    Bₘ₊₁,₂
                ENDDO
                ...
L'ₘ₊₁:          DO I'ₘ₊₁ = 1,N'ₘ₊₁
                    ...
L'ₙ :               DO I'ₙ = 1,N'ₙ
                        B'ₙ,₁
                    ENDDO
                    ...
                ENDDO
                ...
                Bₘ,₂
            ENDDO
            ...
        B₁,₂
    ENDDO
```

FIG. 4

OUTER LOOP VECTORIZATION

BACKGROUND OF THE INVENTION

1. Field of the Invention

The present invention pertains to the field of compilers for computer programs and, more particularly, to a method of vectorizing nested loops.

2. Background Information

Vectorization is one of the most fundamental and effective techniques for exploiting parallelism. Vector computers such as those described in U.S. Pat. No. 4,128,880, issued Dec. 5, 1978 to Cray and U.S. Pat. No. 4,636,942, issued Jan. 13, 1987 to Chen et al., the disclosures of which are hereby incorporated by reference, have been used to obtain large increases in processor bandwidth through the use of sets of pipelines which can operate in parallel to speed processing of data. Vector processors will usually operate most effectively on arrays of data. In some situations, however, performance enhancements can be obtained by transforming scalar operations into vector computations. For example, the loop

DO I=1,64 A(I)=A(I)+5 ENDDO can be vectorized by fetching 64 different A(I) values to a vector register, adding 5 to each element of the vector register and storing the resulting vector back into A(I). In contrast, serial execution will perform 64 fetching, 64 addition and 64 storing operations. The total vector operations for the above loop are {fetch, add, store} while serial execution requires sixty four iterations of the fetch, add, and store scalar operations. Vectorization is typically performed during code compilation. A wide range of vectorizer designs have been proposed.

Related Loop Transformations

The fundamental transformations involved in vectorizing a loop include statement re-ordering, loop distribution, strip-mining and vector statement generation. These are summarily described as follows.

Statement re-ordering interchanges the textual positions of two statements within a loop body. Loop distribution splits a loop with more than one statement into a sequence of loops by distributing the control over single of less-sized group of statements. Strip-mining blocks the iteration space into strips, where each strip's length is equal to or smaller than the vector length of the underlying vector register. Vector statement generation is essentially mapping the input source code into machine vector code. It involves code generation for vector load and store operations.

In terms of legality, i.e., whether or not a particular loop transformation can be carried out, two statements can be re-ordered if there is no loop-independent dependence between the two statements. Loop distribution is legal if there is no loop-carried dependence pointing backward. Strip-mining a loop is always legal.

Vectorization of Nested Loops

Nested loops are those iterative sequences in which a loop is placed within another loop. For instance, the instruction sequence

```
(1)     DO I = 1, 64
(2)       IF A(I) = 0 THEN
(3)         T = B(I)
(4)         DO J = 1, 12
(5)           T = T / C(I,J)
(6)         ENDDO
(7)         B(I)=T
(8)       ENDIF
(9)     ENDDO
``` is a nested loop in which the innermost loop is the DO J loop while the outer loop is the DO I loop. Vectorization of a nested loop can be complicated. The simplest approach to nested loop vectorization is to vectorize the innermost loop. In some cases, however, as in the example shown above, the innermost loop may not be vectorizable due to a command or data dependency. (In the example above the inner DO J loop is not vectorizable due to the recurrence/cycle of T at line 5.) In other cases, even where the innermost loop is vectorizable the program may operate most efficiently if a non-innermost loop is the loop that is vectorized. (For instance, even if the inner DO J loop could be vectorized, the inner loop has a trip count of only 12 and cannot yield much performance improvement. On the other hand, the DO I loop has a trip count of 64.)

The potential benefits of non-innermost loop vectorization (also termed "outer loop vectorization" or "OLV") have been recognized. One of the most powerful OLV restructuring transformations presented to date is loop interchange (see, e.g., Banerjee, *Loop Transformations for Restructuring Compilers*, The Foundations, Kluwer Academic Publishers, 1993; Wolf, "Advanced Analysis and Optimizing for Parallelism", WORKSHOP, Oregon Graduate Institute, 1993; and Zima et al., Supercompilers for Parallel and Vector Computers, ACM Press Frontier Series, Addison-Wesley, Menlo Park, Calif., 1991). Under loop interchange the positions of the innermost loop and the target non-innermost loop are swapped, resulting in the innermost placement of the target loop. Loop interchange has been used to achieve such different optimization objectives as vectorization, parallelization and locality. In vectorizing, loop interchange has been used to move loops with cyclic dependencies outward and to move those loops without dependencies inward. The innermost loop or loops can then be vectorized to improve performance.

For instance, Wolf suggests the vectorization of an outer loop via loop interchange followed by inner loop vectorization. Wolf also describes "super vector" performance, a technique in which an innermost vectorizable loop is moved outward in order to enhance memory reuse. Finally, Wolf discusses nested loop vectorization but limits it to situations where one or more vectorizable loops can be moved to become the most deeply nested loops.

Zima et al. and in Allen et al. describe a framework which can be used to generate vector code for a statement S at all levels. (See Allen et al., "Automatic Translation of Fortran Programs to Vector Form," *ACM Transactions on Programming Languages and Systems*, 9(4):491–542, October 1987.) The framework operates to breaks dependence cycles by determining the smallest number $c_o$ such that the serial execution of the $c_o$ outermost loops suffices to break the dependence cycle; the remaining innermost loops, if any, can then be executed in vector mode. Under the framework, an outer loop is not vectorized if there is a recurrence on any of its inner loops. Loop interchange is used to move the recurrence outward.

Bose, "Heuristic Rule-Based Program Transformations for Enhanced Vectorization," *Proceedings of the Interna-*

*tional Conference on Parallel Processing*, 1988, proposes a knowledge-base approach under which a vectorization program works with the user interactively to come up with the best possible form of source code to be submitted to the compiler. Bose teaches that outer-loop vectorization can be used to improve register reuse. This framework also uses loop interchange to 'innermost' an outer vector candidate loop.

In some situations, however, loop interchange may not be legal. Furthermore, even when interchange is legal, interchanging can potentially destroy vector reuse opportunities, resulting in a net performance degradation.

For instance, in order to carry out the loop interchange operation in a nested loop, it is necessary to convert the nested loop into a perfect nest. Lines 2, 3 and 7 in the nested loop example above hinder the formation of a perfect nest. Line 2 (i.e., the IF-conditional) can be pushed inside the J-loop. But lines 3 and 7, since they have been generated by scalarization techniques, cannot be eliminated so easily. (For more information on scalarization techniques see S. Carr, *Memory-Hierarchy Management*, PhD thesis, Rice University, October 1992, which is hereby incorporated by reference.) In fact, there is no known compiler technique which can reverse-scalarize; forward scalarization is popular since it yields several advantages, but reverse scalarization has not yet been developed. Thus, the above loop example cannot be transformed into a perfect nest. This implies that the I-loop cannot be made innermost and hence that the I-loop cannot be vectorized. In other words, the traditional approach fails to vectorize the outer loop.

Furthermore, even if the loop-interchange were to be successful, e.g., if lines 3 and 7 were absent, there may be more than one choice of loop for vectorization. Suppose the above nested loop, instead of being a 2-level nested loop, was a 3-level nested formed by adding, for instance, an additional loop DO K=1,64 at the outermost level. Now, both the I-loop and the K-loop are vectorization targets and a decision must be made as to which loop to vectorize. This decision cannot always be answered by the techniques of loop interchange followed by innermost loop vectorization. Instead, a framework is needed for guiding the vectorization of non-innermost loops without loop interchange and for optimally selecting the non-innermost loop having the largest return from vectorization. In addition, a composite performance metric is needed for capturing the most significant cost parameters of vector computer operation and for predicting the performance improvement that can be expected if a particular loop is vectorized.

SUMMARY OF THE INVENTION

The present invention is a method of vectorizing a non-innermost loop of a nested loop which does not rely on loop interchange. According to the method, the iterative loops of a nested loop are analyzed to determine if they can be vectorized (vector legality). If more than one iterative loop can be vectorized, a selection criteria is applied to select the iterative loop which would provide the most return from vectorization (vector selection).

BRIEF DESCRIPTION OF THE DRAWINGS

FIG. 4 illustrates an n-level nested loop;

DETAILED DESCRIPTION OF THE PREFERRED EMBODIMENT

In the following detailed description of the Drawings, reference is made to the accompanying drawings which form a part hereof, and in which is shown by way of illustration a specific embodiment in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
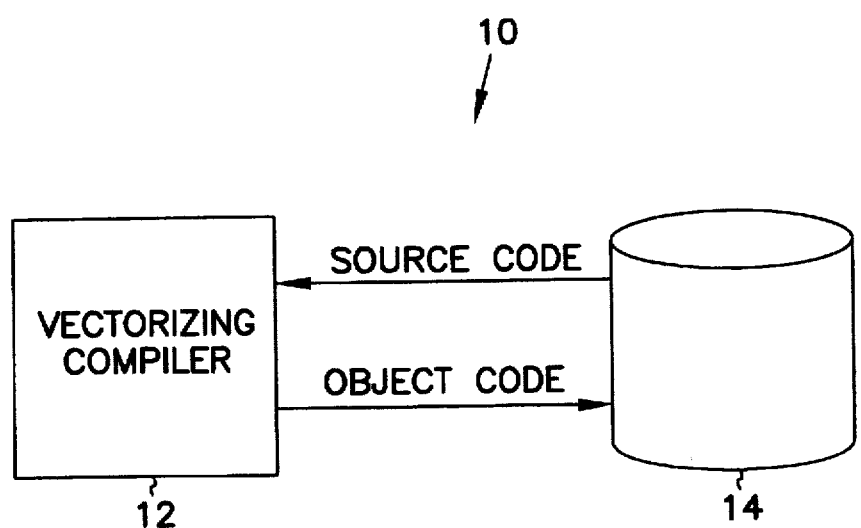
FIG. 1 is a functional block diagram of vectorizing compiler which can be used to vectorize loops in source code according to the present invention.
Figure 2:
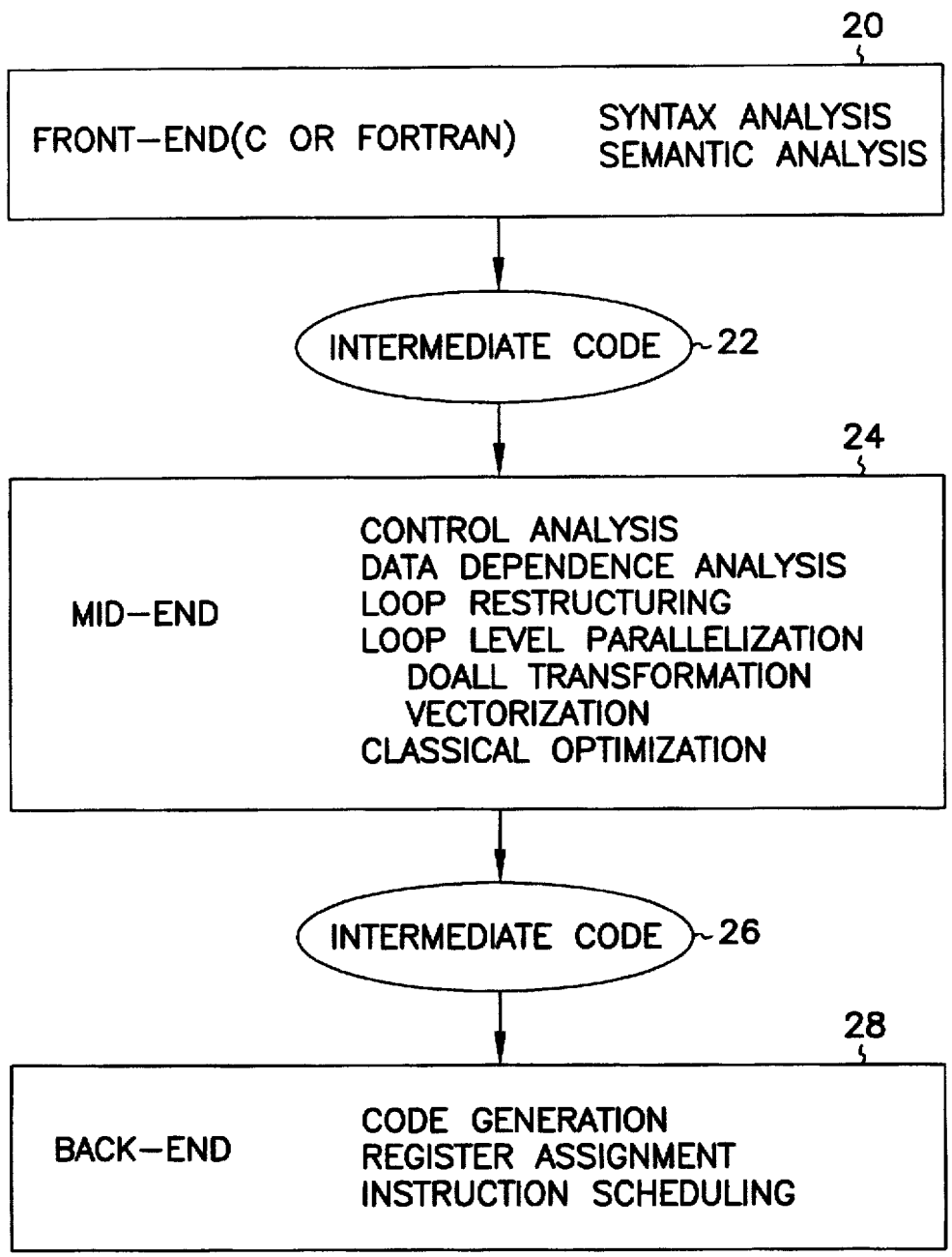
FIG. 2 is a flow diagram of the steps taken by a computer in compiling source code into executable code.

FIG. 1 shows a computer system 10 having a vectorizing compiler 12 connected to a storage unit 14. In a sequence such as is shown in FIG. 2, source code stored in storage unit 14 (such as C or FORTRAN code) is read by compiler 12, is analyzed, a check is made for vectorizable code and the code is then compiled. The compiled code is then stored back to storage unit 14. In the preferred embodiment, vectorizing compiler 12 is implemented as a software program running on a computing platform such as a mainframe or a workstation.

One embodiment of the sequence of steps performed by vectorizing compiler 12 is shown generally in FIG. 2. In FIG. 2, at step 20 compiler 12 reads source code from storage unit 14 and performs syntax and semantic analyses. If the analyses complete in a normal manner, intermediate code 22 is produced and stored either within compiler 12 or back in storage unit 14. Control then moves to step 24.

At step 24, compiler 12 reviews intermediate code 22 for vectorizable loops. This review includes both control and data dependence analysis. In particular, vectorizing compiler searches for nested loops in order to determine whether one or more of the iterative loops can be vectorized. If more than one loop of a nested series of loops can be vectorized, compiler 12 assesses the relative value of vectorization of each of the vectorizable loops and selects one of the loops as the optimal loop to be vectorized. In addition to nested loop vectorization, other classical optimization techniques may be applied to further improve the performance of the generated code. Step 24 produces intermediate code 26 from intermediate code 22 and stores intermediate code 26 either within compiler 12 or back in storage unit 14. Control then moves to step 28.

At step 28, compiler 12 reads intermediate code 26 into memory, generates executable code based on intermediate code 26 and assigns registers or schedules instructions as applicable. Compiler 12 stores the resulting executable code either within compiler 12 or back in storage unit 14.

Outer Loop Vectorization Using Direct Vectorization

The problems associated with vectorization of nested loops through loop interchange described above can be alleviated to some extent by maintaining each loop's position within the nested loop. One problem with such a direct vectorization OLV approach is that for any non-innermost loop the contents of loops internal to that loop may be varying. Therefore, any method used to vectorize a non-innermost loop must determine not only the data and control dependencies of the loop in question but also the execution constraints imposed by the loops internal to that loop. One method of doing so is described next.

In one embodiment of the present invention, when compiler 12 determines the presence of a nested loop within the source code being compiled it enters a special routine which analyzes each iterative loop within the nested loop to determine if it is vectorizable (vector legality). If more than one iterative loop is vectorizable, compiler 12 then applies a selection criteria to select an optimal iterative loop from the plurality of iterative loops (vector selection).

Figure 3:
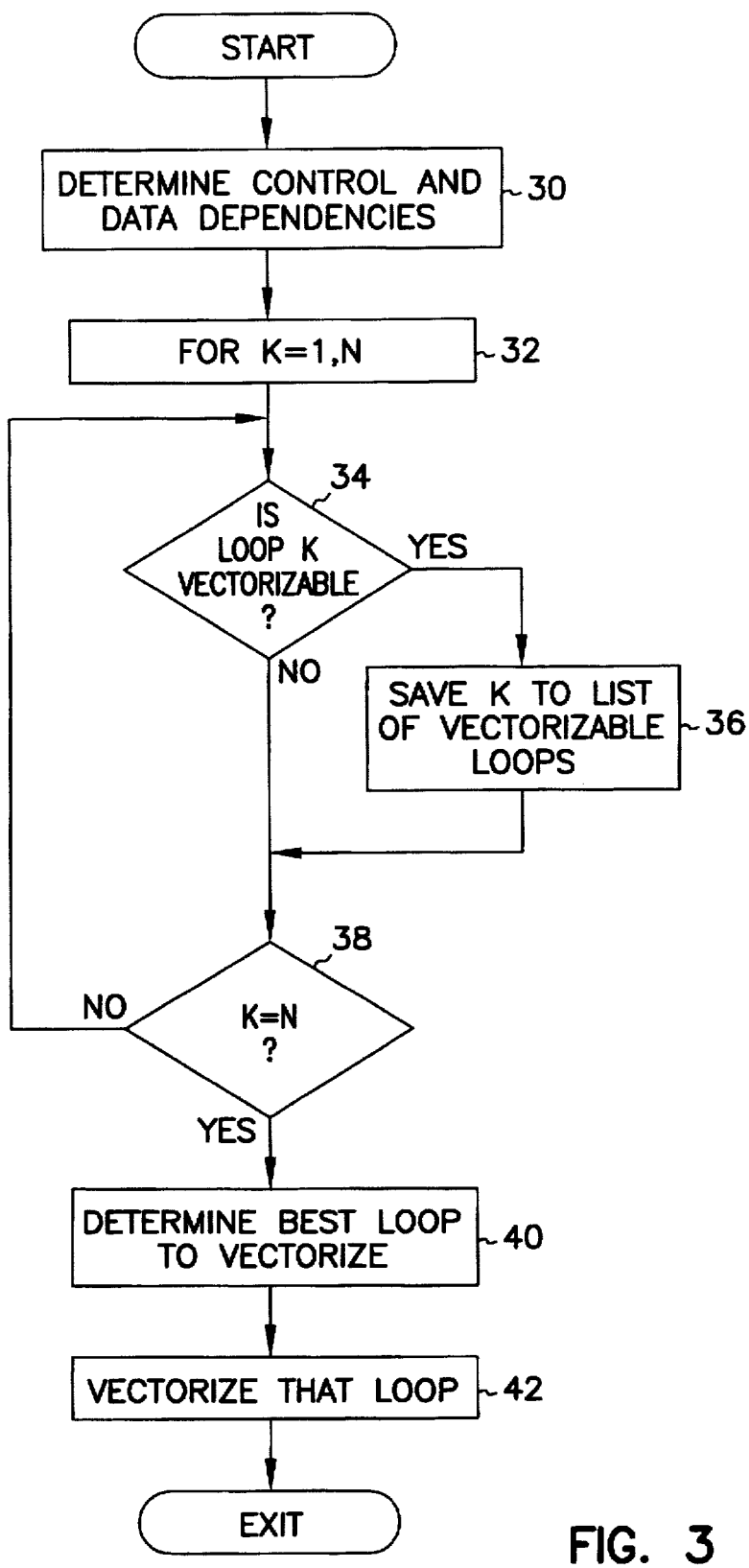
FIG. 3 is a flow diagram of the steps taken by a computer in determining whether vectorization of a particular loop within a nested loop is legal and whether it is optimal.

A representative sequence of steps performed by compiler 12 in determining optimal direct vectorization of loops within a nested loop is shown generally in FIG. 3. In FIG. 3, compiler 12 begins by moving to step 30 where control and data dependencies inherent to the nested loop are determined. Control and data dependency analysis is well known in the art (see, e.g., Ferrante et al., *The Program Dependence Graph and Its Use in Optimization*, ACM Transactions on Programming Languages and Systems, pp. 319–349, Vol. 9, No. 3, July 1987 and Ballance et al., *Program Dependence Graphs for the Rest of Us*, Technical Report 92-10, The University of New Mexico, Department of Computer Science, August 1992, which are hereby incorporated by reference.). In one such embodiment, the control and data dependency analysis is performed by constructing a program dependence graph for the nested loop. (The advantage of the program dependence graph is that it explicitly represents both control and data dependencies. Since both dependencies are present in a single form, transformations like vectorization can treat control and data dependence uniformly as will be detailed below.)

Control dependency analysis looks at whether execution of one of the vertices in the graph conditionally depends upon the execution of another vertex. Data dependence analysis captures the dependence relationship between successive iteration instances of an iterative loop. A data dependence relation is a read-write ordering (i.e. a constraint) with respect to a particular data element which must be followed to preserve the semantic intent of the original code. Details on data dependence can be found in the Zima et al. reference cited in the Background of the Invention.

In the following discussion, the term data dependence encompasses three classes of data dependence: flow, anti, and output. Therefore we have defined a symbol $\delta^*$ which denotes the class of data dependencies including flow, anti and output dependencies. Let S and T denote statements in a loop body. Then a dependence T $\delta^*$ S is termed backward iff S lexically precedes T. Otherwise, the dependence is a forward dependence.

Once the control and data dependencies are known, compiler 12 moves to step 32 and enters an iterative loop to determine the vectorizable loops. In the example shown in FIG. 3, the nested loop is an N-level nested loop. At step 34, a check is made on the kth level loop to determine if it is vectorizable. If not, control moves to step 38. If, however, the kth-level loop is vectorizable, control move to step 36 and a designation for that loop is added to the list of vectorizable loops. Control then moves to step 38.

At 38, a check is made to see whether k=N. If so, the loop is exited and control moves to step 40. If not, control moves to 34, k is incremented and the next higher level loop is examined.

At 40, compiler 12 applies selection criteria to the loops contained in the list of vectorizable loops compiled above and determines the loop which provided an optimal return on vectorization. At 42, that optimal loop is vectorized.

Program Model

A program model for direct vectorization will be described next. That program model will then be used to further develop the concept of vector legality for direct vectorization.

In the following discussion the lexicographic ordering is defined as follows. Let $I=(i_1, i_2, \ldots i_m)$ and $J=(j_1, j_2, \ldots j_m)$ denote vectors of m integers, I, J $\in Z^m$. We make the following definitions involving I:

I is a zero vector if all its elements are zero.

The leading element of I is the first nonzero element.

lev(I) is the position of the leading element. For example, if $i_l$ is the leading element of I then lev(I)=L. If I is a zero vector then lev(I)=∞.

The leading negative element of I is the first negative element.

The leading positive element of I is the first positive element.

I is lexicographically positive (negative) if its leading element is positive (negative).

The sign of an integer i is denoted by sign(i) and is one (1) if i is positive, minus one (−1) if i is negative and zero if i=0.

I is a direction vector if each of its components is one of the integers 1, 0, −1.

The distance vector d of I, J, is denoted by dist(I,J) and is defined by dist(I,J)=J−I.

The direction vector $\theta$ of I, J, denoted by dir(I,J), is the sign of the distance vector d=dist(I,J). Thus for all loop levels, k (1≤k≤m), $\theta$ is defined as follows:

$$\theta_k = \begin{cases} 1 & \text{if } d_k > 0 \\ 0 & \text{if } d_k = 0 \\ -1 & \text{if } d_k < 0 \end{cases}$$

The partial order relation $I<_l J$ is defined as follows:

$$i_1=j_1, i_2=j_2, \ldots, i_{l-1}=j_{l-1}, \text{ and } i_l>j_l.$$

An n-level nested loop is shown in FIG. 4. In FIG. 4, for any given value of k (where (1≤k≤n)), loop $L_k$ at level k contains two instruction sequences $B_{k,l}$ (where (1≤l≤2)). Each $B_{k,l}$ consists of a combination of sequences of assignment and conditional statements. Therefore, there are ($N_1 \times N_2 \times \ldots \times N_n$) instances of the innermost loop body $B_{n,l}$.

Gamma ($\Gamma$) will be used as a generic term to denote the iteration space of $L_k$, (1≤k≤n). Let S and T be two assignment statements in the loop body. Then we write S<T if S lexically precedes T. The lexicographical ordering of statements is total. Let << denote serial execution order. The serial execution order of the instances of S $\in B_{n,1}$ is defined by $S(I)<<_l S(J)$ iff $I<_l J$; this can be written as $S(I)<<_\theta S(J)$ iff $\theta=\text{dir}(I, J)$. A similar notation is used to express dependencies. We say that $S(I) \delta_\theta T(J)$ iff $S(I)<<_\theta S(J)$.

Let G=<V,E,$\Gamma$> be the associated program dependence graph for the loop model where V is the set of all nodes in FIG. 4. In addition, V includes the requisite START, STOP, MULTI and LOOP nodes.

E is the set of all dependence edges. E is a subset of $V \times V \times Z^n \times L$ where L is the set of dependence types: L={control, anti, flow, output}, T is a node type mapping. Given a node $m \in V$, T(m) identifies the type of node m as one of the following: START, STOP, IF, MULTI, LOOP.

Let $e \in E$, then e is a dependence edge of the form $e=(S,T,\theta,\alpha)$, where $S,T \in V$, with $\theta \in Z^n$ and $\alpha \in$ {control, anti, flow, output}. We use $e=(S,T,\theta)$ as a shorthand to denote a data dependence edge.

Let $G'=<V,E'>$ denote the data dependence subgraph of G where $$E'=\{e=(S,T,\theta,\alpha) \in E: \alpha \in \{anti, flow, output\}\}$$

We augment G' to form a level k data dependence graph. The data dependence graph for a loop at level k is represented by $G_k=<V_k,E_k>$, a k-th level dependence graph of G', where $V_k=\{\mu \in V: \mu \in B_{h,1}$ where $h \geq k$ and $1 \geq l \geq 2\}$ and $E_k=\{e=(S,T,\theta) \in E'$ and $S,T \in V_k: lev(\theta)=k$ or $lev(\theta)=\infty\}$.

A level k program dependence graph is a graph formed by layering the control and $G_k$ subgraphs. Let $G_{pk}=<V_{pk},E_{pk}>$ denote a program dependence graph for some loop at level k where $E_{pk}=\{e=(S,T,\theta,\alpha) \in E: e \in E_k$ or $\alpha=\{control\}\}$ and $V_{pk}=\{\mu,v \in V: \exists \theta, \alpha, (\mu,v,\theta,\alpha) \in E_{pk}\}$.

A dependence path in $G_{pk}$ is a path $\pi=P(G_{pk})$ of the form $\pi=S_1,S_2,\ldots,S_t$ where $S_r (1 \leq r \leq t)$ are assignment statements and for every q $(1 \leq q \leq t)$ the dependence $S_q \delta^* S_{q+1}$, where * $\in$ {control, anti, flow, output}, holds.

Let $C(S,G_{pk})$ denote the set of all cyclic paths from S to S in $G_{pk}$, where S is a statement in $V_k$. We have $C(S,G_{pk}) = \{\pi: \pi = P(G_{pk}) = S_1,S_2,\ldots,S_t$ is a path in $G_{pk}$, where $t \geq 1$ and $S_1 = S_t = S\}$.

The Outer-Loop Vectorization Framework

Two forms of loop structure are popular: the serial loop and the fully parallel loop (i.e., DOALL). Neither structure can adequately express the execution order of statements within a vectorized loop. Consider, for instance, a loop

DO I=1,2
S(I)
T(I)
ENDDO where S and T represent assignment statements and where the execution constraints include a forward loop-independent dependence between S(I) and T(I) but where S(I) and T(I) are separately vectorizable.

If this is declared as a serial loop then the execution order is $S(1) \rightarrow T(1) \rightarrow S(2) \rightarrow T(2)$, which does not allow any opportunity for vectorization. On the contrary if this is declared as a DOALL loop, then the two threads (S1→T1) and (S2→T2) can be executed in parallel. Yet, neither of these two lexical structures permit the user to specify a vectorization of the form:

Step 1: Vector execution of S(1) and S(2)
Step 2: Vector execution of T(1) and T(2)

which is needed to vectorize within the above execution constraints. Note that Step 1 must be totally completed before Step 2 can begin execution. In other words, there ought to be four execution orderings: S(1)→T(1), S(1)→T(2), S(2)→T(1), and S(2)→T(2). The serial loop syntax does not implement the S(2)→T(1) part, despite implementing such unwanted orderings as S(1)→S(2) and T(1)→T(2). The DOALL loop misses the S(1)→T(2) and S(2)→T(1) constraints.

In light of these shortcomings, we propose the DOVEC construct which precisely implements the above four (and only four) execution orderings. Syntactically, the DOVEC construct uses the word 'DOVEC' instead of 'DO' in the loop header. DOVEC emulates the effect of vectorization of a loop at a particular level in the nested loop.

Vector Execution Ordering Rules: A Basic Constraint

First, we consider a single DOVEC loop without any inner nesting depth, i.e., a single level loop, with I as the iteration count and two statements S and T constituting the loop body. Assume S lexically precedes T. Let $i_1$ and $j_1$ be two instances of the I trip count. Thus, I, J $\in \Gamma$. Let vl denote the degree of parallelism in a hardware vectorizer (e.g., with a 64-element vectorizer, vl would be 64). The vector execution ordering constraints ($v^{vl}$) of this single loop is given as follows:

1. $S(i_1) < T(j_1)$ iff $[i_1/vl] \leq [j_1/vl]$
2. $T(i_1) < S(j_1)$ iff $[i_1/vl] \leq [j_1/vl]$
3. $T(i_1) < T(j_1)$ iff $[i_1/vl] \leq [j_1/vl]$
4. $S(i_1) < S(j_1)$ iff $[i_1/vl] \leq [j_1/vl]$ where a vl of one corresponds to a serial execution order and where, when vl is very large (i.e., approaching infinity), then the condition (1) above is trivially implied while the condition (2) cannot be satisfied. Thus, with the generic DOVEC construct, in situations where vl can be arbitrarily large, the condition (2) can never be met.

This is not true, however, for a mixed loop nest. A mixed loop nest is a nest of loops consisting of one or more DO loops and a single DOVEC loop. This is the situation that arises when one loop out of the nested loop is vectorized. Let $(L_1,L_2,\ldots,L_{l-1},L_l,L_{l+1},\ldots,L_m)$ denote a mixed loop nest where the $l^{th}$ loop $L_l$ is a DOVEC loop. Every other loop in the mixed nest is a DO loop. Let B(I) denote an instantiation of the loop body of $L_1$.

Definition 1 (Vector Execution Order: $v_l$)

The vector execution order at level 1 for $L_p$, denoted by $v_l^{vl}$, is defined by the following rules ($v_l$ is a short hand for the vector execution order constraints at level 1 when vl is infinitely large):

1. If I and J are index values such that $I <_k J$ where $k \neq l$, then all iterations of B(I) shall be executed before the iteration instance B(J).

2. If I=J; S and T are statements in B; and S<T, then instance S(I) of S shall be executed before the instance T(I) of T.

3. Let I and J be index values such that $I <_l J$. Let $I'=(i_1,i_2,\ldots,i_{l-1},0,i_{l+1},\ldots,i_m)$, $J'=(j_1,j_2,j_{l-1},0,j_{l+1},\ldots,j_m)$ and statement S<T in B.
   3.1 If I'=J', then S(I) shall be executed before T(J).
   3.2 If $I' <_k J'$ where $l < k \leq m$, then the iteration B(I) shall be executed before the iteration B(J).
   3.3 If $J' <_k I'$ where $l < k \leq m$, then the iteration B(J) shall be executed before the iteration B(I).

For example, consider the mixed loop nest below:

DO $I_1$ = 1, 2
 DOVEC $I_2$ = 1, 2
  DO $I_3$ = 1, 2

```
    S(I_1, I_2, I_3)
    T(I_1, I_2, I_3)
  ENDDO
ENDDOVEC
ENDDO
```

Figure 5A:
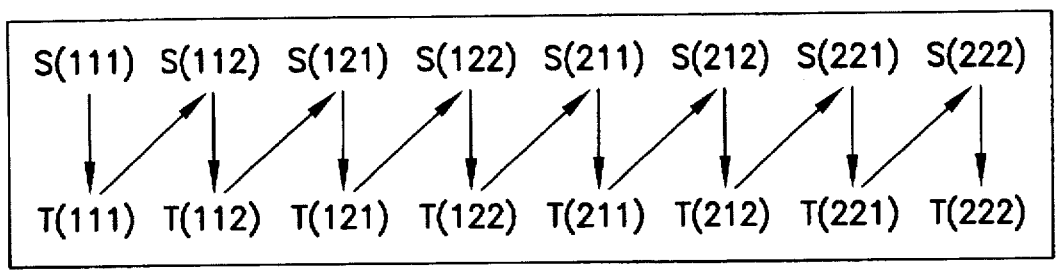
FIGS. 5a and 5b illustrate statement execution orderings.
Figure 5B:
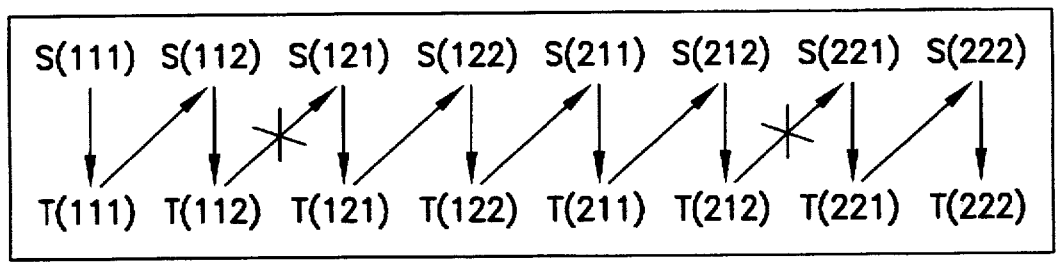

The mixed loop nest is of three levels, of which the innermost and outermost level loops are DO-loops and the middle loop is a DOVEC. This would be equivalent to direct vectorization of the middle loop. FIG. 5a shows the execution order for serial execution of the above loop nest without vectorization (treating DOVEC as a simple DO loop). FIG. 5b shows the execution order after direct vectorization of the middle loop. It should be noted that FIG. 5b shows two serial ordering edges that are no longer in the vector execution order. It is the detection of these missing edges and the determination of whether they are critical to existing data dependencies which drives direct vectorization.

Vector Legality

The transformations necessary to perform innermost loop vectorization have been well studied (see, e.g., either of the Wolf or the Zima et al. references cited in the Background of the Invention). However, the feasibility of vectorizing a non-innermost loop has not been addressed and is the focus of this section. This section will develop a framework to determine when it is feasible to vectorize an outer loop. Vectorization of a loop at level k, $L_k$, requires ensuring that:

1. The data dependence relation (generated by the loop) is not violated by the constraints of $v_k$.
2. There is no dependence cycle within the statements in the loop and all dependencies are forward.

If so, we can rewrite the loop body with a sequence of vector statements.

We focus on condition (1) and derive a condition for which $v_k$ of all statement instances at $L_k$ is semantically valid. $L_k$ being non-innermost doesn't change the applicability of statement reordering and loop distribution to satisfy condition (2). The following theorem ensures $G_k$ contains the necessary data dependence edges to verify whether or not $v_k$ violates a program semantic.

Theorem 1

The execution order constraints imposed by $E'-E_k$ are satisfied by $v_k$.

Proof

Choose an arbitrary $e \in E'-E_k$. Let $e=(S,T,\theta)$. Then choose any I, J $\in \Gamma$ such that sign $(J-I)=\theta$. We will show that $((S, I), (T, J)) \in v_k$. That is, that $S(I)<T(J)$ is in the vector execution order $v_k$. Let $h=\text{lev}(\theta)$. Since $e \notin E_k$, $h<k$ or $h>k$ (and $h \neq \infty$). But by rule 1 of the definition of $v_k$ in Definition 1 above, $h \notin \{\infty,k\} \rightarrow >S(I)<T(J)$.

In essence Theorem 1 argues that if a data dependence edge, e, is carried by an outer loop, $L_{\text{lev}(e)}$ where (lev(e)<k), the dependence will be satisfied by serial execution of that outer loop. If, however, e is carried by an inner loop (lev(e)>k), $v_k$ will not disturb the serial execution order of its inner loops. In either case, e can be ignored. For example, consider the following nest:

```
DO I = 1, 100
  DO J = 2, 100
    A(I,J) = f(A(I,J - 1)
  ENDDO
ENDDO
```

The nest has a recurrence generated by the inner do-j loop. However, since $E_1=\phi$, the recurrence/edge can be ignored.

Given that we know some of the data edges to include for legality test of $v_k$, let us now characterize some of the data dependence constraints that will be violated by $v_k$.

Definition 2

A dependence $S_1 \delta^* S_2$ is k-vectorization preventing iff $v_k$ violates the data dependence.

Theorem 2

Let $\theta$ be the direction vector associated with a dependence $S \delta^* T$ in loop $L_k$. Let $i_k$, $i \in \theta$, denote repetition of i a total of h times. If h is zero then $i \notin \theta$. $\theta$ is k-vectorization preventing if $\theta=(0^{k-1}, 1, 0^h, -1, \ldots)$ where $h \geq 0$.

Proof

Let $I=(i_1, \ldots, i_k, \ldots, i_h, \ldots)$ and $J=(j_1, \ldots, j_k, \ldots, j_h, \ldots)$ be two arbitrary iteration vectors in $\Gamma$ such that sign $(J-I)=\theta$. Thus $i_k<j_k$ and $i_h>j_h$. Hence $I<_k J$ and $S(I)<T(J)$. We will show that $v_k$ will execute $T(J)$ before $S(I)$. Let $I'=(i_1, \ldots, i_{k-1}, 0, i_{k+1}, \ldots)$ and $J'=(j_1, \ldots, j_{k-1}, 0, j_{k+1}, \ldots)$. Since $i_l=j_l$ where $1 \leq l <h$ and $j_h>i_h$, we have $I'<_k J'$ and by rule 3.3 of the definition of $v_k$ in Definition 1 above, $T(J)$ will be executed before $S(I)$.

Figure 6:
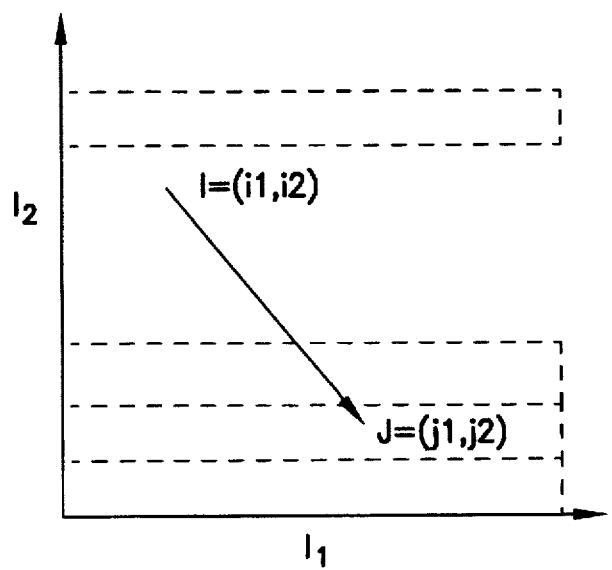
FIG. 6 shows an example of a data dependence constraint.

Theorem 2 identifies the set of constraints in the iteration space which will be violated by $v_k$. These constraints effectively inhibit vectorization along the k-th dimension. Suppose a data dependence constraint imposes an ordering in the iteration space as shown in FIG. 6, $v_1$ will violate the constraint $I<_1 J$ (with $i_1<j_1$ and $i_2>j_2$) by executing J before I.

Lemma 1

$E_k$ contains all the potential k-vectorization preventing dependencies for $v_k$.

Proof

For any arbitrary edge $e=(S,T,\theta)$, we have $\text{lev}(\theta)=k$. By definition of $E_k$, $e \in E_k$.

Let $E_k$ denote a set of k-vectorization preventing dependence edges in $E_k$, where $E_k^P=\{e \in E_k: e=(S,T,\theta) \text{ and } \theta \text{ is k-vectorization preventing}\}$. The following theorem establishes that a loop $L_k$ is vectorizable if $G_{pk}$ contains no cycle and there exists no k-vectorization preventing dependence in $G_{pk}$.

Theorem 3

Given (1) there are no cycles in $G_{pk}$ and (2) $E_k^P=0$, it follows that for any $\sigma$ compatible with $E_k$, $v_k(\sigma)$ satisfies all data dependencies and will not violate the program semantic (i.e. after statements are reordered according to $\sigma$, vectorization of $L_k$ is legal).

Proof

Since control dependencies can be converted to data dependencies without loss of generality, we will assume that $E_{pk}=E_k$. Suppose $E_k^P=0$ and $v_k$ violates the program semantic; we will show that there exists a cycle in $G_{pk}$. The idea that $v_k$ violates the program semantic implies that there is a serial ordering $S(I)<<_\sigma T(J)$ for some I, J $\in \Gamma$ and $S,T \in V_k$ and that this order must be retained because of the presence of dependencies. $v_k$, however, does not retain this order, i.e. $((S,I),(T,J)) \notin v_k$. By theorem 1 above, $e=(S,T,\theta) \in E_k$. If $S=T$ then $(S,S,\theta)$ is a cycle in $G_{pk}$ and the proof is done. Suppose that $S \neq T$. Then $\text{lev}(\theta) \neq \infty$ since $S<T$ implies $((S,I), (T,J)) \in v_k$ (rule 2 of the definition of $v_k$ given above), contradicting the hypothesis; and $T<S$ is inherently impossible. Therefore, $\text{lev}(\theta)$ must be k. Given that $e \notin E_k^P$, suppose case $S<T$: this is not possible since $((S,I), (T,J)) \in v_k$ by rule 3.1 and 3.2 of the definition of $v_k$ above (and $e \notin E_k^P$).

case $T<S$: for some $\pi$ in $G_{pk}$ where $e \in \pi$. If $\pi \notin C(S,G_{pk})$ then T and S can be reordered since $\text{lev}(\theta)=k$. This contradicts the hypothesis. Therefore $\pi$ must be in $C(S,G_{pk})$. We conclude that there exists a cycle in G.

Therefore, through Theorem 3 we know that when the ordering imposed by the vector execution order at a particular level is a superset of the ordering imposed by the program dependencies, the loop at that level can be vectorized.

Figure 7:
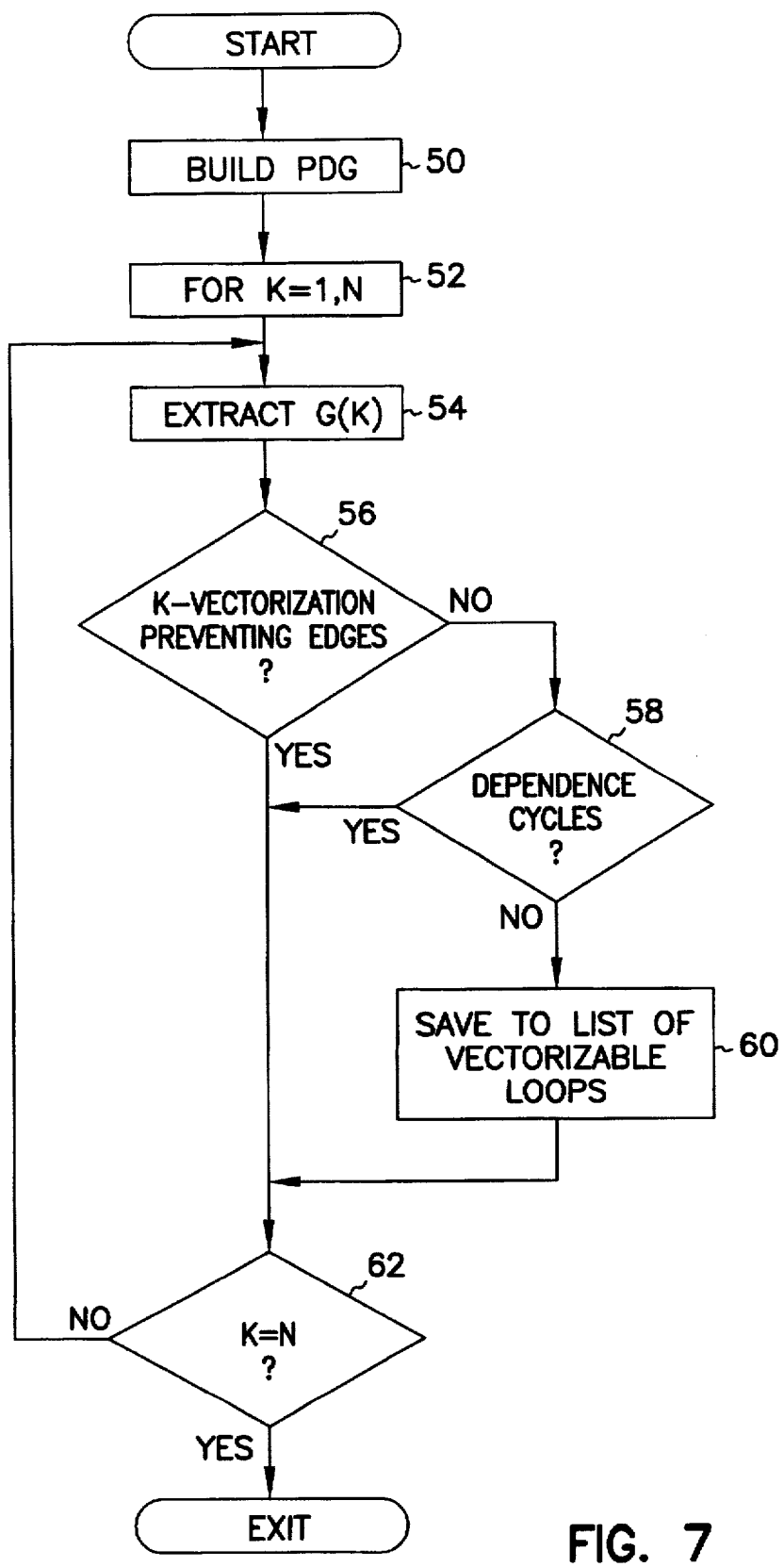
FIG. 7 is a more detailed flow diagram of the steps taken by a computer in FIG. 3 when determining whether vectorization of a particular loop within a nested loop is legal.

One embodiment of the sequence of steps 30 through 38 taken to determine vector legality in FIG. 3 is shown in FIG. 7. In FIG. 7, at 50 compiler 12 prepares a program dependence graph (PDG) for the nested loop. As detailed above, the PDG provides a picture of both the data and control dependencies in one graph. Once the control and data dependencies are known, compiler 12 moves to step 52 and enters an iterative loop to determine the vectorizable loops. As in the example shown in FIG. 3, the nested loop is an N-level nested loop. At step 54, a level dependence graph for level k is extracted from the program dependence graph. (The level dependence graph $G_{p,k}$ is described at the top of page 12. Each level dependence graph includes dependence edges relevant to vectorization of the nested loop at that level.) Once $G_{p,k}$ is extracted from the program dependence graph, Theorem 1 guarantees that $G_{p,k}$ captures all the control and data dependence edges that the compiler must consider to safely vectorize the kth loop.

At step 56, the level k dependence graph is examined for k-vectorization preventing edges. For example, in FIG. 5b if you are going to vectorize the outer loop you must make sure that there are no dependence edges indicated at the the crossed-out edges. If there are such edges (termed k-vectorization preventing edges), then according to Theorem 2 the nested loop cannot be vectorized at level k; control then moves to step 62. If, however, there are no k-vectorization preventing edges, the nested loop may still be able to be vectorized at level k and control moves to step 58 for a dependence cycle check.

At step 58, the level dependence graph for a level k is examined for dependence cycles. For instance, the graph can be fed to a cycle detection algorithm such as that described in Tarjan, "Depth First Search and Linear Graph Algorithms", *SIAM Computing*, 1, pp. 146–60. If there are any level k dependence cycles, the nested loop cannot be vectorized at level k and control moves to step 62. If, however, there are no level k dependence cycles, the nested loop can be vectorized at level k and control moves to step 60. At 60, a designation for the kth level loop is added to the list of vectorizable loops and control moves to step 62.

At 62, a check is made to see whether k=N. If so, the loop is exited.

Direct vectorization therefore provides a mechanism for vectorization of non-innermost loops without the overhead, including the tracking of data dependencies, imposed by the loop interchange schemes described above.

Vector Selection

The previous section developed a framework for legality of outer loop vectorization. Since there can be only one loop in the nest that can be vectorized, we now focus on the question which loop to vectorize when there is more than one loop choice. Vectorizing a loop implies that a vector sequence of vector instructions is generated for that loop. Different loops require different vector sequences and the performance of the loop depends on the selected vector sequence.

There are many parameters in each loop contributing to the differences among the loops. We call these parameters vector variants and they include:

Trip count(T): T is the length of the loop.

Gather/Scatter(GS): GS is indirect load or store, e.g., in A(INDX(I)).

Conditional(C): C indicates whether or not the vector sequence is conditional.

Stride-1(V): V is the physical stride between consecutive memory locations.

Reduction(R): R is a vector code sequence which re-associates the computation; refer to Table 1 for an example of vectorization of a vector reduction loop.

TABLE 1

| | |
|---|---|
| DO i = 1, 512 | tmp(0) = s |
| s = s + a(i) | DO i = 1, 512, 64 |
| ENDDO | tmp(i:i+63) = tmp(i:i+63) + a(i:i+63) |
| | ENDDO |
| | s = tree_height_reduction(tmp(1:64)) |

Let A={T, GS, C, V, R}. With two loops to choose from, there are |A|×|A| combinations that need to be considered in order to select which loop to vectorize. We will show a few combinations using small code fragments.

```
REAL a(1000,1000), b(1000,1000), c(1000)
DO i = 1, 10
   DO j = 1, 10
      a(i,j) = a(i,j) + 1
   ENDDO
ENDDO
```

Assume the array element's layout is column-major. Vectorizing the i loop is a better choice because "i" has V (stride one access).

The trip count of the loop, T, is also another important parameter. Suppose that $T_j$ is much larger than $T_i$,

```
DO i = 1, 10
   DO j = 1, 100
      a(i,j) = a(i,j) + 1
   ENDDO
ENDDO
``` then the cost trade off between V and T must be determined.

Cost trade-off must also be made between a vector loop, i, and a reduction loop, j. For example, in the nested loop

```
DO i = 1, 100
   DO j = 1, 100
      c(i) = c(i) + a(i,j)
   ENDDO
ENDDO
``` vectorizing loop-i is more profitable. However, if $T_j$ is much larger than $T_i$, for example, in the following nested loop

```
DO i = 1, 10
   DO j = 1, 1000
      c(i) = c(i) + a(i,j)
   ENDDO
ENDDO
``` then vectorizing loop-j would be more profitable.

Gather/scatter and conditional operations could also have different impacts on loop choice. For example, in

```
DO i = 1, 10
   DO j = 1, 1000
      IF (c(i)) THEN
         a(i,j) = b(i,indx(j))
      ENDIF
   ENDDO
ENDDO
``` a decision to vectorize loop-i results in vector accesses which are strider but are conditional. A decision to vectorize loop-j avoids the condition problem (c(i) is invariant with respect to loop-j) but the access to b(i,indx(j)) requires an additional vector load.

Vector Selection Metric

From the discussion above it is apparent that, in selecting a loop to be vectorized from a set of n loops, there are $|A|^n$ combinations of cost trade-offs that must be considered. We propose a metric which is computationally less intensive than the exhaustive computations of all combinations. This metric computes the overhead cost associated with each loop if it were to be executed as vector. The overhead of each loop is then compared to decide which loop should be vectorized. There are three different sources of vector overhead in this metric: vector loop overhead (VLO), vector start up (VSC) for each vector operation, and memory access overhead (MO). VLO is the cost needed to strip-mine the loop when its trip count is larger than the vector length (VL) of the vector register. VSC is overhead needed to initiate the vector instruction. MO is overhead for non-unit stride access.

The vector variants defined in A above can be equated to overhead. T and V have a direct relation to VLO and MO, respectively. Others need to be converted. C implies the memory operations it controls are being converted to GS. GS is treated as two MO's. R translates to an MO plus initial set up cost plus final reduction cost. Table 2 below shows the summary of the various costs. Unit stride is used as a base unit for memory operation.

TABLE 2

| Overhead | Value | When | Comment |
|---|---|---|---|
| VLO | 0 | trip < VL | no loop structure |
|  | c1 | trip ≥ VL | remaining vector and branch back |
| VSC | c2 | always | vector startup cost |
| ML | VSC | unit stride | memory load |
|  | VSC+c3+c4 | reduction | c3: setup c4: final reduction |
|  | VSC+c5 | non-unit stride | unit stride used as base |
| MS | VSC | non-unit stride | memory store |

We now define the metric as $$O_l = (VLO + (T_l/VL)*(ML+MS))/T_l$$

where (T/VL) is the number of vector trips. The metric computes the overhead associated with each loop of interest. Since the metric is measured in term of overhead, preference will be given to loops with lower overhead.

Let us apply the metric to the previous examples. Assume that VLO=20 and VSC=5.

```
DO i = 1, 10
  DO j = 1, 10
    a(i,j) = a(i,j) + 1
  ENDDO
ENDDO
``` then, $$O_i = (0 + 1*(VSC + VSC))/10$$

$$O_j = (0 + 1*(VSC + c5 + VSC))/10$$

and, since c5>0, loop-i is a better choice.
On the other hand, for the nested loop

```
DO i = 1, 10
  DO j = 1, 100
    a(i,j) = a(i,j) + 1
  ENDDO
ENDDO
```

$$O_i = (0 + 1*(VSC + VSC))/10$$

$$O_j = (0 + 1*(VSC + c5 + VSC))/100$$

$$= (4 + 2*c5)/100$$

and loop-j is the better choice as long as the non-unit stride latency is less than 30. In the nested loop

```
DO i = 1, 100
  DO j = 1, 100
    c(i) = c(i) + a(i,j)
  ENDDO
ENDDO
``` then, $$O_i = (VLO + 2*(2VSC + VSC))/100 = 50/100$$

$$O_j = (VLO + 2*(VSC + c3 + c4 + VSC + c5 + VSC))/100$$

$$= (50 + C3 + C4 + C5)/100$$

and, therefore, loop-i is better.
In the nested loop

```
DO i = 1, 10
  DO j = 1, 1000
    c(i) = c(i) + a(i,j)
  ENDDO
ENDDO
``` then, $$O_i = (0 + 1*(2VSC + VSC))/10 = 15/10$$

$$O_j = (20 + 16*(VSC + c3 + c4 + VSC + c5 + VSC))/1000$$

$$= (260 + 16*(c3 + c4 + c5))/1000$$

and, therefore, loop-j is the better candidate if the overhead of reduction and non-unit stride for a(i,j) is less than 77.5. Finally, in the nested loop

```
DO i = 1, 10
  DO j = 1, 1000
    IF (c(i)) THEN
      a(i,j) = b(i,indx(j))
    ENDIF
  ENDDO
ENDDO
``` then, $$O_i = (0 + 1*(VSC + VSC + c5))/10 = (50 + c5)/10$$

$$O_j = (VLO + 16(VSC + VSC + c5))/1000$$

$$= (500 + 16*c5)/1000$$

and loop-j is a better choice.

Figure 8:
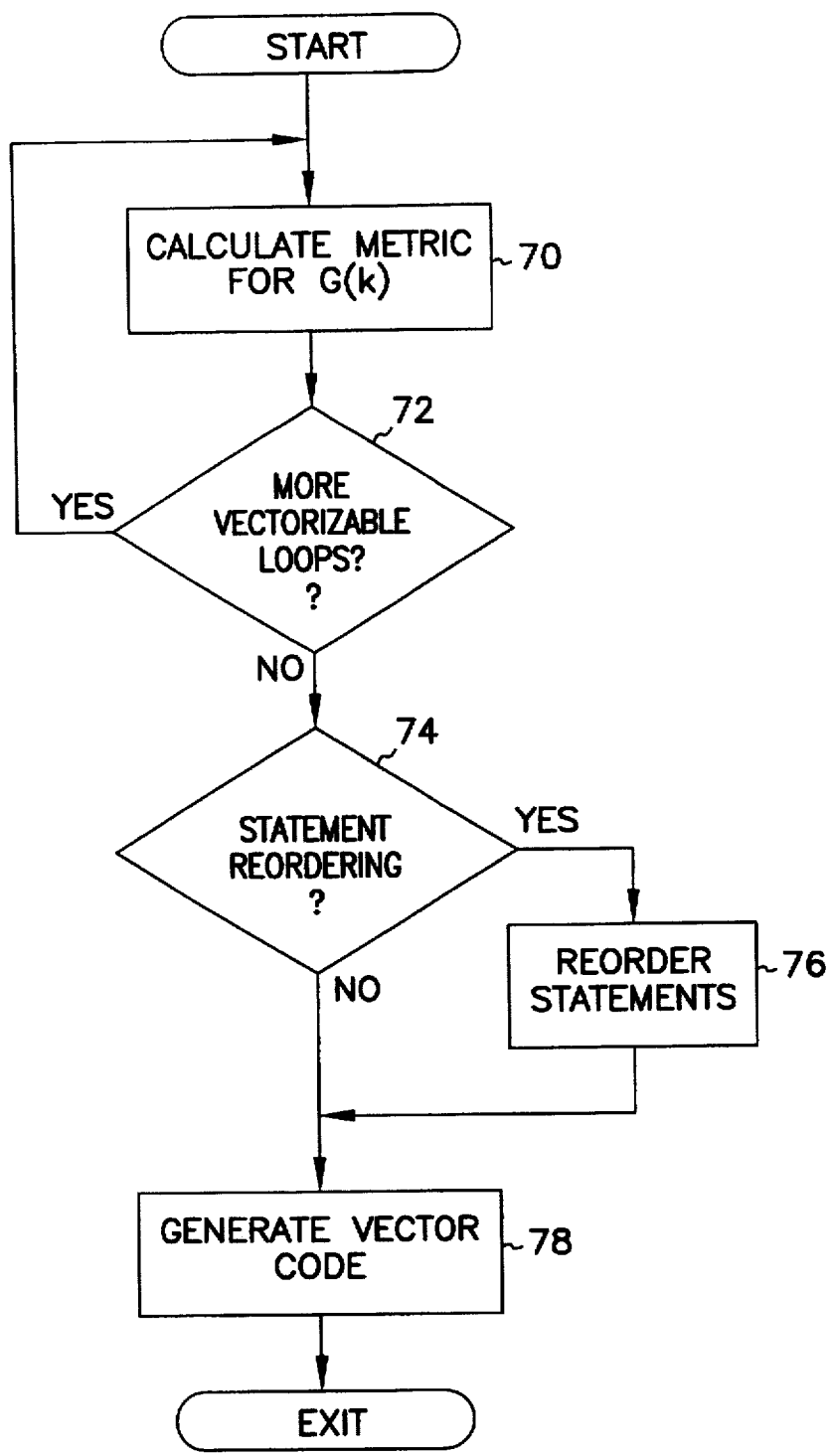
FIG. 8 is a more detailed flow diagram of the steps taken by a computer in FIG. 3 to select the optimal loop to be vectorized.

One embodiment of the above selection metric as applied to steps 40 and 42 in FIG. 3 is shown in FIG. 8. In FIG. 8, at steps 70 and 72 compiler 12 calculates a value for each of the vectorizable loops using the above metric. This continues until the list of vectorizable loops is exhausted. The vectorizable loop having the highest value metric is then selected as the loop to be vectorized. The loop to be vectorized is examined at 74 to determine if statements within the loop should be reordered. Statement reordering is crucial in vectorizing loops which may otherwise not be vectorizable. For instance, in the code fragment produced below the outer loop DO-i is not vectorizable because there is a flow backward induced by B.

```
DO I = 1, 100
  DO J = 2, 100
    A(I,J) = f(B(I,J))
    A(I + 1,J) = g(A(I,J - 1))
  ENDDO
ENDDO
```

The loop is, however, vectorizable with statement reordering.

If the statements do not have to be reordered, control moves to 78. If, however, a determination is made at 74 that statements within the loop should be reordered, control moves to 76, statement reordering occurs in a manner known in the art and control moves to 78. At 78 vectorized code for the nested loop is generated and the routine is exited.

Experiments and Observations

This section presents experimental results of outer loop vectorization opportunity and performance using Perfect Benchmark code.

Experiment Description

Our environment is a Cray Y-MP8 (shared-memory multiprocessor with eight PEs). Each PE has 64-element vector capability. Total system memory size is 256 MB arranged in 256 banks. The CPU clock cycle is 6.0 nanosecond. The Unicos operating system runs on this eight-processor platform, which supports autotasking. The Cray Fortran-90 environment was used. That environment includes state-of-the-art dependency analysis, loop restructuring techniques and can detect many DOALL loops thereby generating parallel SPMD programs. The OLV framework is implemented in the restructuring phase of CF90.

The restructuring phase of CF90 consists of many transformations. Among the transformations, two relevant transformations which impact the data being collect for OLV are perfect-nest-creation and loop-collapse. Perfect-nest-creation uses loop distribution to create a perfect nest out of non-tightly nested loops. A non-tightly nested loop will be made into a perfect nested loop if distribution does not require any scalar expansion. Loop-collapse reduces the nesting depth of a loop nest by making the trip count of a particular loop, L', longer. This transformation always improves the performance of the nest since the resulting collapse nest has less loop control overhead. Furthermore, a longer trip count is desirable if L' is vectorized. Perfect-nest-creation impacts the frequency of the number of imperfect nests and loop-collapse reduces the number of outer loop candidates available for vectorization.

Speedup

For comparison purposes, we instrumented two compilers CF90-I and CF90-O. CF90-I vectorized only the innermost loop, while CF90-O included the outer loop vectorization framework. Performance of the generated code by the two compilers was compared using different input samples. The input samples included selected subroutines from the Perfect Club benchmark and the benchmark itself. Speedup is computed as (time of code generated by CF90-I)/(time of code generated by CF90-O).

To demonstrate the applicability of OLV at the subroutine level, we selected 3 subroutine samples with the following properties:

The nature of the computation of each routine is unique
Each routine has at least one outer loop was vectorized
The nest involving OLV was non-tightly nested The first example tested was the Perfect Club Code 1 benchmark shown below. For Perfect Club Code 1, a speedup of 2.04 was calculated. CF90-O vectorized DO-2 loop, while CF90-I vectorized DO-1 loop. Both loops have the same trip count. In this case, vectorizing the outer loop is better since the inner loop has to perform vector reduction while the outer loop does not.

```
      SUBROUTINE MATVEC (A, B, C)
      DIMENSION A( 12 , 12 ),B( 12 ),C( 12 )
      COMPLEX B, C, SUM
      DO 2 I=1, 12
      SUM = CMPLX(0.,0.)
      DO 1 J=1, 12
      SUM=SUM+CMPLX(A(I,J)*REAL(B(J)),A(I,J)*AIMAG(B(J)))
1     CONTINUE
      C(I) = SUM
2     CONTINUE
      RETURN
      END
```

The second example tested was the Perfect Club Code 2 benchmark shown below. For Perfect Club Code 2, a speedup of 1.2 was calculated. CF90-O vectorized DO-3 loop, while CF90-I vectorized the DO-1 and DO-2 loops. Speedup can mainly be attributed to longer vector length with no additional vector overhead.

```
      SUBROUTINE SUMPLS(FLN,AP,AM,PLN)
C     SR COMPUTES FOURIER MULTIPLIERS
C     IN AP COEFFS. OF SYMMETRIC LEGENDRES
C     IN AM COEFFS. OF ANTISYM. LEGENDRES
      DIMENSION AP(31), AM(31), IPLN(32,31), FLN(31,31)
      COMPLEX AP,AM,FLN
      DO 3 L=1, 31
      CRP=0.
      CIP=0.
      DO 1 I=1, 31 ,2
      CRP=CRP+PLN(I,L)* REAL(FLN(I,L))
      CIP=CIP+PLN(I,L)*AIMAG(FLN(I,L))
1     CONTINUE
      CRM=0.
      CIM=0.
      DO 2 I=2, 30 ,2
      CRM=CRM+PLN(I,L)* REAL(FLN(I,L))
      CIM=CIM+PLN(I,L)*AIMAG(FLN(I,L))
2     CONTINUE
      AP(L)=CMPLX(CRP+CRM,CIP+CIM)
      AM(L)=CMPLX(CRP-CRM,CIP-CIM)
3     CONTINUE
      RETURN
      END
```

The last example tested was the Perfect Club Code 3 benchmark shown below. For Perfect Club Code 3, a speedup of 15.24 was calculated. CF90-O vectorized DO-4 and DO-8 loops, while CF90-I vectorized DO-3, DO-7 and DO-6 loops. Speedup can be attributed to much longer vector length and to the fact that the variable SUM is treated as a vector invariant. This results in significant vector load and store savings.

```
      SUBROUTINE VERTIC(F,EIGG,EIGGT,DOTPRO,MODS,INOUT)
      DIMENSION EIGG(12,12), EIGGT(12,12), DOTPRO(12)
      COMPLEX F( 961 , 12 ),COL( 12 ),SUM
C     INOUT=-1 TO OBTAIN VERTICAL MODE EXPANSION
C     INOUT=+1 TO OBTAIN SPET. COEFS. FROM VERTICAL EXPANSION
      IF(INOUT)10,20,30
```

```
10      CONTINUE
         DO 4 I=1, 961
         DO 2 MOD=1,MODS
         SUM=(0.,0.)
         DO 1 LEV=1, 12
         SUM=SUM+CMPLX(EIGGT(LEV,MOD)* REAL(F(I,LEV)),
     1     EIGGT(LEV,MOD)*AIMAG(F(I,LEV)))
1       CONTINUE
2       COL(MOD)=CMPLX(DOTPRO(MOD)*REAL(SUM),
         DOTPRO(MOD)*AIMAG(SUM))
         DO 3 MOD=1,MODS
3       F(I,MOD)=COL(MOD)
4       CONTINUE
20      RETURN
30      CONTINUE
         DO 8 I=1, 961
         DO 5 MOD=1,MODS
5       COL(MOD)=F(I,MOD)
         DO 7 LEV=1, 12
         F(I,LEV)=(0.,0.)
         DO 6 MOD=1,MODS
         F(I,LEV)=F(I,LEV)+CMPLX(EIGG(LEV,MOD)*REAL(COL(MOD)),
     1     EIGG(LEV,MOD)*AIMAG(COL(MOD)))
6       CONTINUE
7       CONTINUE
8       CONTINUE
         RETURN
         END
```

As noted above, our framework was implemented in CF90, the Cray Fortran 90 compiler. Experiments were performed on a Cray YMP-8 using a modified version of CF90 to allow compilation with or without OLV. OLV opportunity was found in 305 of 1168 vectorizable nests in the Perfect Club Code benchmark, with OLV actually selected for 66 nests. Significant (up to 15×) speedup at the subroutine level of some routines were also observed. Similar results can be expected from implementation of the OLV framework in vector computing systems running Fortran or other programming languages.

It is clear that direct vectorization of non-innermost loops provides an advantageous increase in the efficiency of loop execution. This application is intended to cover any adaptations or variations of the present invention and is therefore limited only by the claims or equivalents thereof.

What is claimed is:

1. A computer-implemented method of vectorizing a nested loop having a plurality of iterative loops, the method comprising the steps of:

analyzing each iterative loop to determine if it is vectorizable, wherein the step of analyzing each iterative loop includes the steps of:

preparing a program dependence graph for the nested loop, wherein the program dependence graph explicitly represents both control and data dependencies; and extracting, from the program dependence graph, a level dependence graph for each of the plurality of iterative loops, wherein each level dependence graph includes all control and data dependencies relevant to vectorization of the nested loop at that level;

determining for each iterative loop whether dependence edges in its respective level dependence graph include a vectorization preventing dependence edge;

determining for each iterative loop whether there are dependence cycles within its respective level dependence graph; and if an iterative loop from the plurality of iterative loops has no vectorization preventing dependence edges and no dependence cycles within its respective level dependence graph, indicating that the iterative loop is vectorizable; and if more than one iterative loop is vectorizable, applying a selection criteria to select an optimal iterative loop from the plurality of iterative loops.

2. The method according to claim 1 wherein the step of applying a selection criteria comprises the steps of:

calculating a metric for each iterative loop in the plurality of iterative loops; and choosing the iterative loop with the best metric.

3. A computer-implemented method of vectorizing a nested loop having a plurality of iterative loops, including a kth-level iterative loop, wherein k is an integer greater than one, the method comprising the steps of:

preparing a program dependence graph for the nested loop, wherein the program dependence graph explicitly represents both control and data dependencies;

extracting, from the program dependence graph, a level dependence graph for the kth-level iterative loop, wherein the level dependence graph includes all control and data dependencies relevant to vectorization of the nested loop at level k;

determining whether any dependence edges within the level dependence graph are k-vectorization preventing;

determining if there are any dependence cycles within the level dependence graph; and if none of the dependence edges are k-vectorization preventing and if there are no dependence cycles within the level dependence graph, vectorizing the kth-level loop.

4. A computer-implemented method of vectorizing a nested loop having a plurality of iterative loops, the method comprising the steps of:

preparing a program dependence graph for the nested loop, wherein the program dependence graph explicitly represents both control and data dependencies;

extracting, from the program dependence graph, a level dependence graph for each of the plurality of iterative loops, wherein the level dependence graph includes all control and data dependencies relevant to vectorization of the nested loop at that level;

determining for each iterative loop whether dependence edges in its respective level dependence graph include a vectorization preventing dependence edge;

determining for each iterative loop whether there are dependence cycles within its respective level dependence graph;

building a list of those iterative loops having no vectorization preventing dependence edges and no dependence cycles within their respective level dependence graphs;

selecting an iterative loop from the list of iterative loops; and vectorizing the selected iterative loop.

5. The computer-implemented method of claim 4 wherein the step of vectorizing the selected iterative loop comprises the steps of:

determining if statements within the selected iterative loop should be reordered; and if the statements should be reordered, reordering the statements.

6. The computer-implemented method of claim 4 wherein the step of selecting an iterative loop from the list of iterative loops comprises the steps of:

calculating a metric for each iterative loop in the list of iterative loops; and choosing the iterative loop with the best metric.

7. The computer-implemented method of claim 6 wherein the step of vectorizing the selected iterative loop comprises the steps of:

determining if statements within the selected iterative loop should be reordered; and if the statements should be reordered, reordering the statements.

8. For computer program code having a nested loop, wherein the nested loop includes a plurality of vectorizable iterative loops, a computer-implemented method of selecting an optimal vectorizable iterative loop from the plurality of vectorizable iterative loops, the method comprising the steps of:

calculating a metric for each of the plurality of vectorizable iterative loops, wherein the step of calculating a metric includes the step of calculating overhead for an iterative loop as:

$$O_i = (VLO + (T/VL)*(ML + MS))T_i$$

where (T/VL) is the number of vector trips; and selecting the iterative loop having the best metric.

* * * * *

UNITED STATES PATENT AND TRADEMARK OFFICE
CERTIFICATE OF CORRECTION

PATENT NO. : 5,802,375

DATED : September 1, 1998

INVENTOR(S) : Viet N. Ngo, Eagan; Wei-Tek Tsai, New Brighton, both of Minnn.

It is certified that error appears in the above-identified patent and that said Letters Patent is hereby corrected as shown below:

At Col. 6, line 47, please delete equation after ellipses "..., $i_{l-1} = j_{l-1}$, and $i_l > j_l$." and insert --..., $i_{l-1} = j_{l-1}$, and $i_l < j_l$ --

At Col. 6, line 63, please delete "iff S(I)" and insert -- if S(I)--

At Col. 7, line 20, please delete "and $1 \geq l \geq 2$}" and insert -- $1 \leq l \leq 2$} --

At Col. 10, line 29, please delete "Let $E_k$" and insert -- Let $E_k^p$ --

At Col. 20, line 23, please delete " $O_l = (VLO + (T_l/VL)*(ML+MS)/T_l$ "
and insert missing bracket in claim -- $O_l = (VLO + (T_l/VL)*(ML+MS))/T_l$ --

Signed and Sealed this

Fourteenth Day of December, 1999

*Attest:*

Q. TODD DICKINSON

*Attesting Officer*     *Acting Commissioner of Patents and Trademarks*